United States Patent [19]
Hebert et al.

[11] Patent Number: 5,769,301
[45] Date of Patent: Jun. 23, 1998

[54] METHOD AND APPARATUS FOR PIVOTALLY MOUNTED MEDIA TRANSPORT BRIDGE WITH IMPROVED COUNTERBALANCE SYSTEM

[75] Inventors: Thomas K. Hebert, Groveland; Mark E. Tellam, Charlestown; Libor Krupica, Methuen; Peter Austin, Wilmington; Edward L. Kelley, Lexington, all of Mass.

[73] Assignee: Agfa Division, Bayer Corporation, Wilmington, Mass.

[21] Appl. No.: 736,234

[22] Filed: Oct. 23, 1996

Related U.S. Application Data

[63] Continuation of Ser. No. 275,166, Jul. 14, 1994, abandoned.

[51] Int. Cl.[6] .................................................. B65H 20/00
[52] U.S. Cl. .......................... 226/108; 226/112; 355/321
[58] Field of Search .................................. 226/112, 108, 226/101, 189; 355/309, 221

[56] References Cited

U.S. PATENT DOCUMENTS

| | | | |
|---|---|---|---|
| 3,110,432 | 11/1963 | Smith | 226/108 |
| 5,080,346 | 1/1992 | Okuzawa | 226/108 X |

FOREIGN PATENT DOCUMENTS

| | | | |
|---|---|---|---|
| 534717 | 3/1993 | European Pat. Off. | 355/321 |
| 1122927 | 8/1961 | Germany | 226/112 |

*Primary Examiner*—Daniel P. Stodola
*Assistant Examiner*—Emmanuel M. Marcelo
*Attorney, Agent, or Firm*—Julie A. Krolikowski; John A. Merecki

[57] ABSTRACT

A media transport bridge is an integral media transport device within an internal drum laser imagesetter that transports media from an imaging area in the drum to an external processor or intermediate buffer. Five pairs of rollers transport the film over the drum. A first stage of the bridge includes a first pair of rollers driven independently so that the first stage is removable and replaceable with a take-up cassette if desired. A friction drive within the imagesetter is adaptable to drive either the first stage or the take-up cassette when installed. Upon removal of the first stage, an automatic adjustment of the bridge is performed to balance the pivotally mounted bridge. The media is moved into the bridge by a pair of drum rollers while the first stage is synchronized with the other four pairs of rollers in the bridge and monitored to keep a slack loop of media at the first stage rollers to eliminate perturbations in the media. A mechanical flag sensor changes state to slow and speed up the bridge rollers to maintain the slack loop.

25 Claims, 9 Drawing Sheets

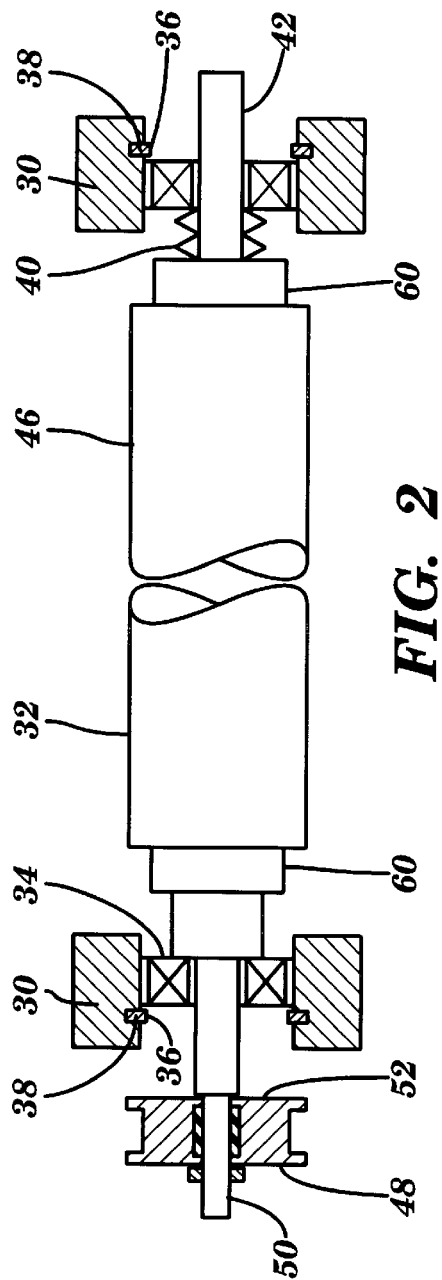
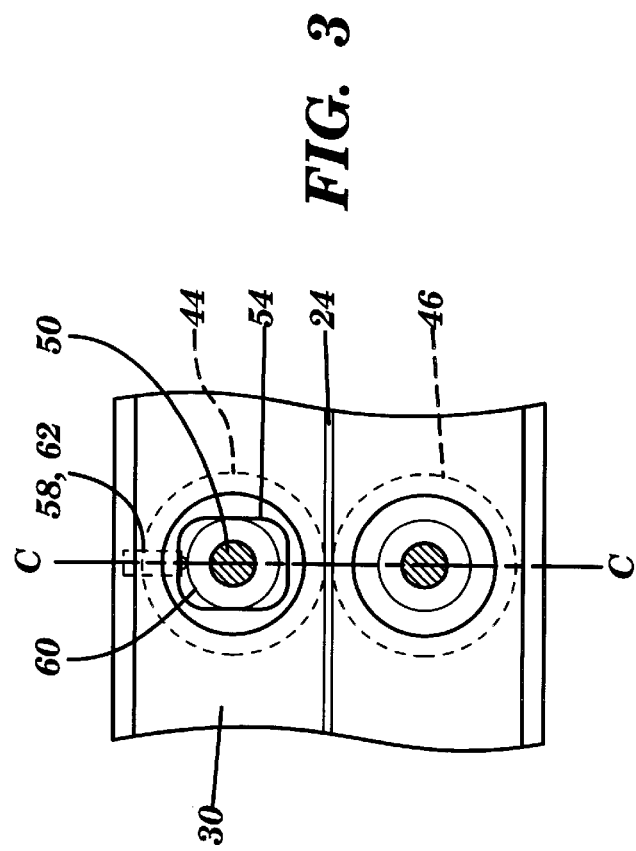
FIG. 2
FIG. 3

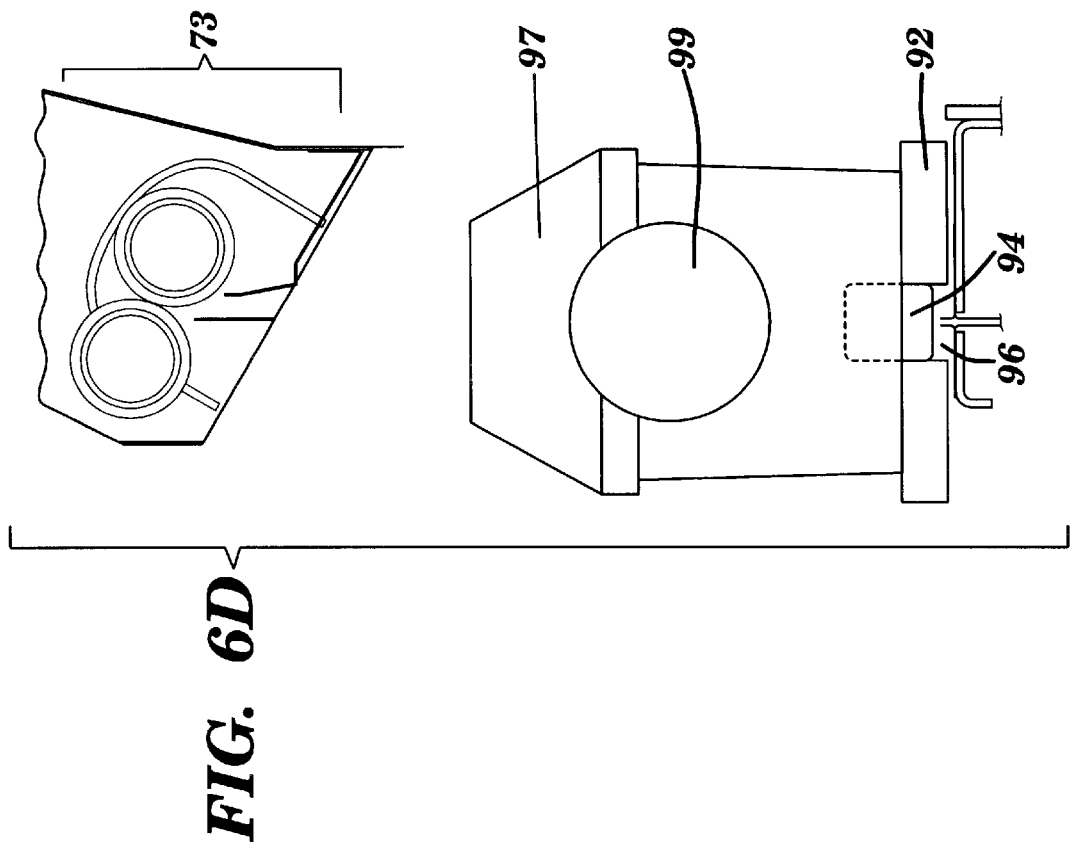
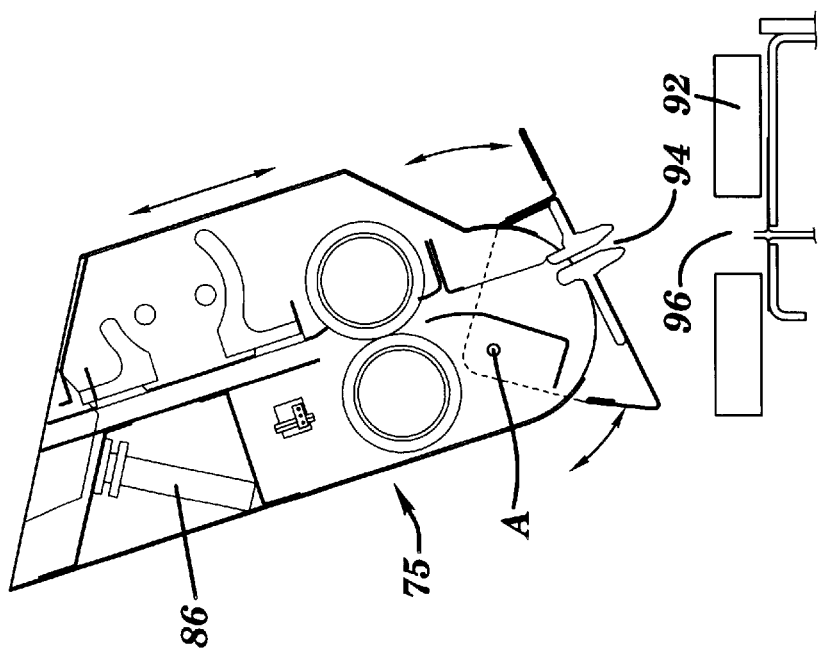
FIG. 6D
FIG. 6C

METHOD AND APPARATUS FOR PIVOTALLY MOUNTED MEDIA TRANSPORT BRIDGE WITH IMPROVED COUNTERBALANCE SYSTEM

This is a continuation of application Ser. No. 08/275,166 filed Jul. 14, 1994 now abandoned.

CROSS REFERENCE TO RELATED APPLICATION

This application is related to copending patent application Ser. No. 08/140,411 filed on Jan. 14, 1994 now abandoned entitled "Dual Media Buffer with Over-Running Clutch System" which is commonly assigned to Miles Inc.

BACKGROUND OF THE INVENTION

This invention relates to transporting web-type media from a first machine operating at a first speed to a second machine operating at a second speed and provides an apparatus to allow each machine to operate at its own speed while minimizing idle time. An example is automated photographic imaging and subsequent developing of web-type media. These consecutive processes usually occur at different operating speeds, and comprise exposure of a image in an imaging device by illumination of photographic media, and subsequent chemical developing of the image in a processing device.

In electronic prepress systems, images to be printed by offset printing means are scanned from photographic sources, digitized, assembled and edited electronically at a workstation, and then transmitted to a raster image processor or "RIP" for half-tone screening and image rasterization. The "RIP image" or the rasterized image to be printed, is then transmitted from the RIP to an imagesetter for photographic or film recording. Such an electronic prepress system is described in U.S. Pat. No. 4,004,079 and is available from Miles Inc. under the Trademark "COLORSCAPE".

An imagesetter includes a supply of unexposed photosensitive media, a recording support surface, and an image exposing system for forming the image to be recorded according to the RIP image data. The image exposing system may employ a laser beam, a cathode ray tube (CRT), an LED emitter or the like as a radiation source. The media passes from a supply roll as a web to the recording support surface at which point the photosensitive media is exposed by the laser beam, forming a latent image on the media. Numerous images may be recorded onto the web consecutively. The exposed web advances onto a take-up cassette that stores the media in light-tight environment. The take-up cassette is then removed and transported from the imagesetter to the media processor where chemical processing occurs. The transport system of the processor usually transports the media at a constant speed during operation.

The system requires the web to be wound onto the take-up cassette at the speed of the imagesetter, the take-up cassette to be physically removed and transported to the processor, and the media to be removed from the take-up cassette at the speed of the processor. Additionally, after developing occurs in the processor, the media must be cut into sheets to separate the images. This requires two manual steps that slow operation and increase down time.

Consequently, a media handling system was developed that provides a bridge from the imagesetter directly to the processor, similar to UK Patent Application GB 2,100,882. Here, an image is recorded onto the web media, advanced and cut within the imagesetter, and then fed into the bridge. The light-resistant bridge receives a single cut sheet of the web media at the imagesetter speed, and then the processor takes the sheet from the bridge at the processor operating speed. This overcomes the problem of transporting the take up cassette and cutting the images manually. However, the imagesetter remains idle while the entire first sheet is processed until the bridge is empty because the imagesetter typically runs faster than the processor. Although this method provides automation, it still requires interruptions in the operation of the imagesetter.

Another disadvantage of the bridge described above is media waste. After forming an image on the media, the media is advanced and cut, and then delivered to the bridge. During this sequence, the end of the image is advanced from the imaging point to the cutting point while no imaging occurs. An unexposed area of media results, from behind the cutter back to the imaging point, as a result of the advancement of the media to be cut from the web. Because this cycle of advancing and cutting occurs often, there are frequent unexposed areas of media, causing undue waste of expensive media.

It is accordingly an object of the invention to internally transport exposed media from an imaging area in an imagesetter to an external processor, and to temporarily store media during subsequent imaging to eliminate waste of media between imaging.

It is an object of the invention to have a media transport bridge integral with an imagesetter. The bridge is designed within an internal drum recorder to transport media from the front of the imagesetter, over the drum, and out the rear of the imagesetter, either directly to a processor, as described above, or to a secondary storage device. The amount of floor space required for the system is reduced.

It is a specific object of the invention to provide the user of a system having an integral media transport bridge, with an option to use a take-up cassette instead of the bridge if so desired, by easily removing a portion of the bridge and replacing it with the take-up cassette.

Another object of the invention is to counter-balance a change in weight of the media transport bridge upon removal of a first stage of the bridge.

SUMMARY OF THE INVENTION

An image recording system for recording a latent image onto a recording media and for processing the latent image, comprising an image recorder for recording the latent image onto the recording media, the image recorder including a front side, a rear side and a recording support surface substantially extending from the front side to the rear side, a processing station adjacent to the rear side, for processing the latent image, and a bridge including a media path for advancing the recording media from the recording surface at the front side to the processing station at the rear side. The bridge further includes a removable portion which is exchangeable with a take-up cassette including a take-up core for receiving the recording media with a latent image recorded thereon and for winding the recording media onto the take-up core instead of advancing the media to the processing station.

A method for recording an image onto a recording media using an image recorder having a front side, a rear side and a recording surface which substantially extends from the front side to the rear side, comprising the steps of, advancing the recording media from a media supply area across a recording surface starting at the rear side and advancing toward the front side, holding the recording media stationary with respect to the recording surface while recording a latent image thereon, advancing the recording media from the recording surface at the front side and out the rear side of the image recorder and providing a processor station adjacent to the rear side of the image recorder including a media transport apparatus for receiving a page from the bridge and for processing the latent image.

BRIEF DESCRIPTION OF THE DRAWINGS

The features and objects of the invention will become apparent in the following description taken with the accompanying drawings, in which:

FIG. 2 is a front view of a drive roller having an integral over-running clutch and drive pulley assembly.

FIG. 3 is a cross-sectional side view of a roller pair mounting used in the media transport bridge.

FIGS. 6a–d are sequential views of the removal of the first stage transport of the media transport bridge of FIG. 1 and installation of a take-up cassette.

DETAILED DESCRIPTION OF THE INVENTION

Figure 1:
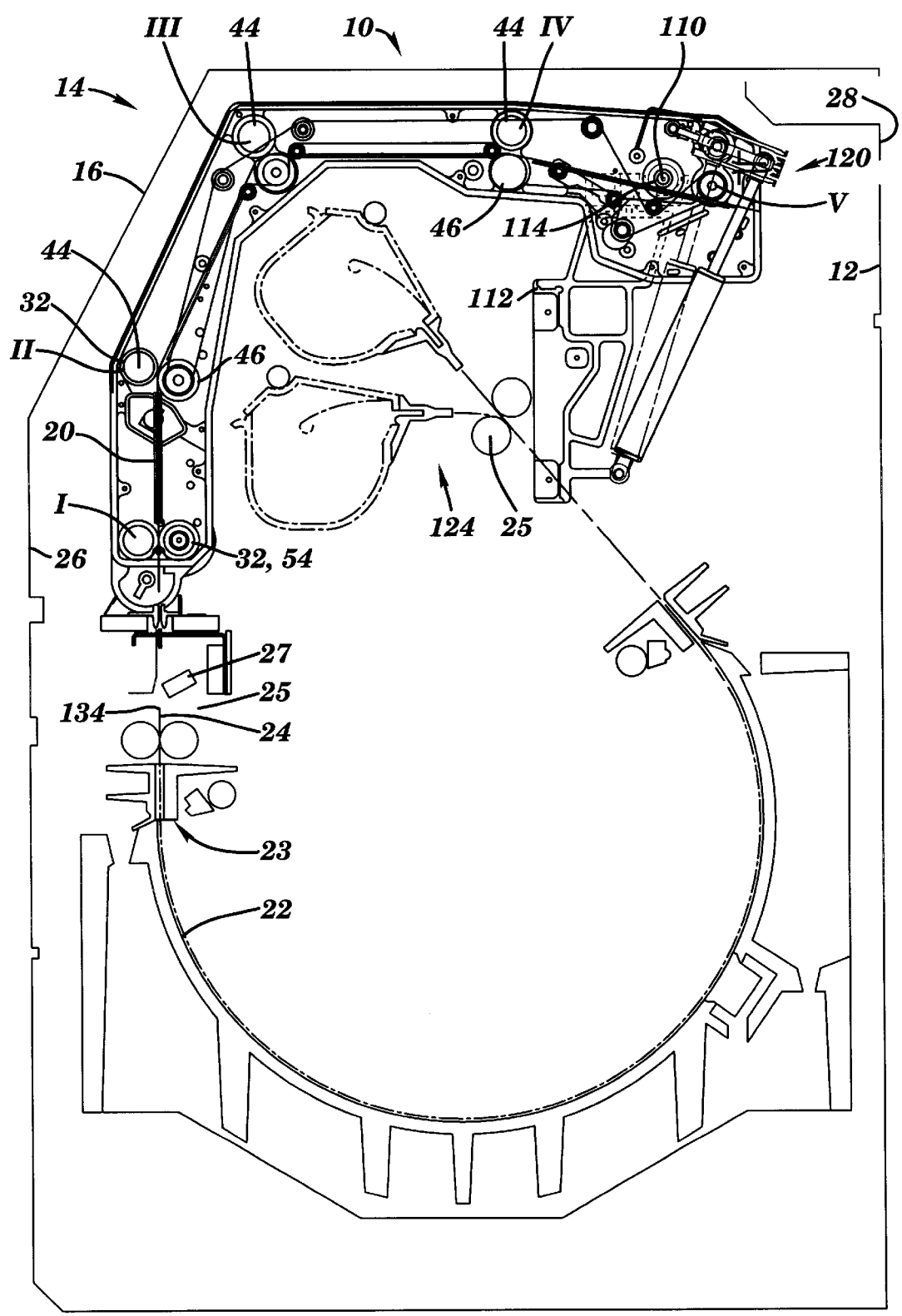
FIG. 1 is a side view of an internal drum recorder employing an internal media transport bridge according to the invention with a side panel of the internal drum recorder removed to view the bridge.
Figure 9:
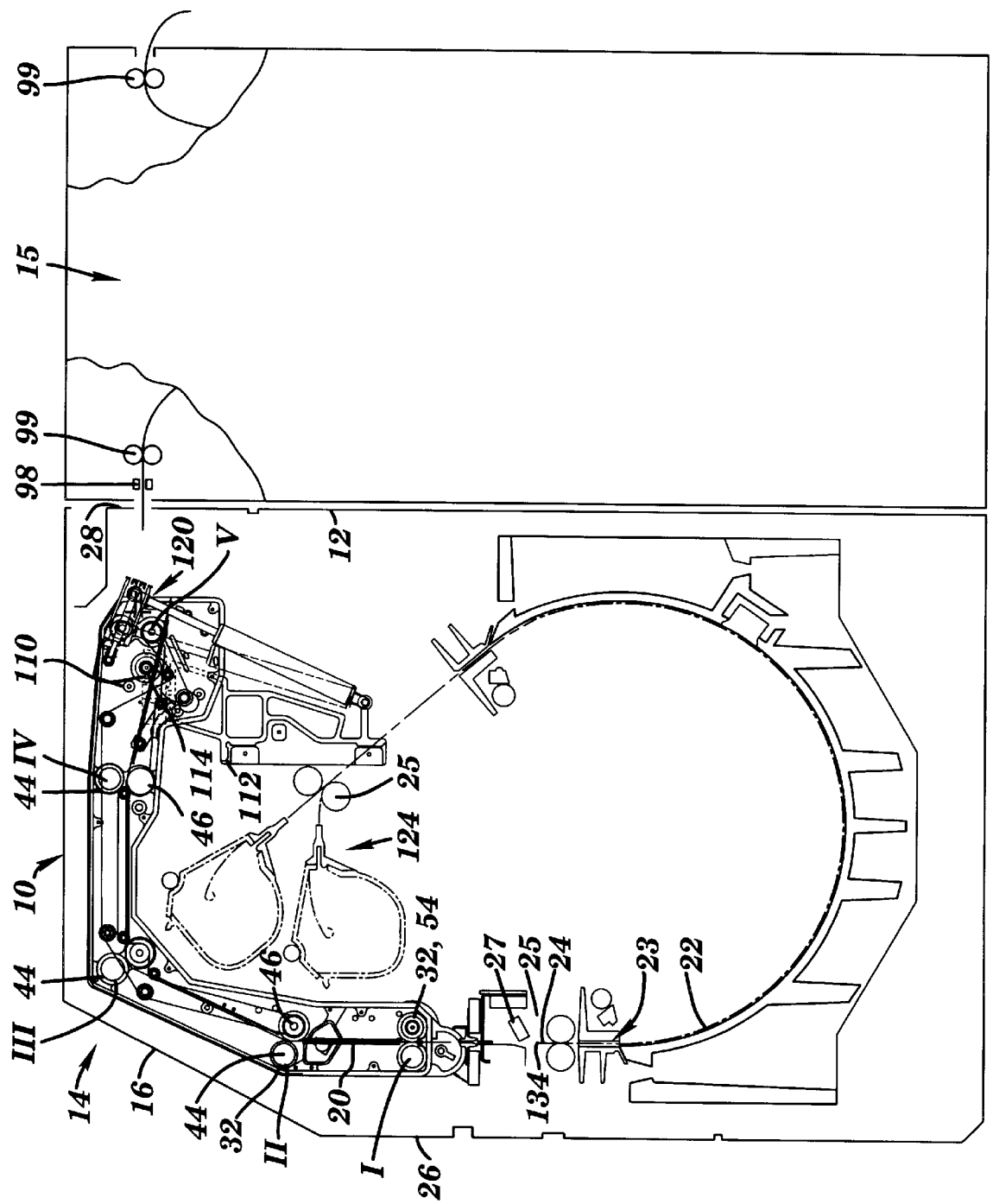
FIG. 9 is a side view of an internal drum recorder employing a media transport bridge having a processing station adjacent the rear side of the internal drum recorder for receiving media from the media transport bridge, with all side panels removed for viewing.

Referring to FIG. 1, and FIG. 9 an internal bridge, generally referred to by reference numeral 10, is shown mounted inside a frame 12 of an internal drum recorder imaging device, generally referred to as reference numeral 14. The bridge 10 is completely enclosed under light-resistant covers 16. The bridge 10 has a media transport path 20 that transports media from the internal drum recording surface 22 at the front 26 of the imaging device 14, over the drum 22 and out a rear side 28 of the imaging device 14 to a processing station generally referred to as reference number 15 or to a secondary storage space (not shown). The design of the media transport path 20 through the imaging device 14 reduces the floor space that is typically required for bridge systems. The footprint, or floor space required, is the same for the imaging device 14 with the internal bridge 10 as it is for the imaging device 14 alone.

Referring to FIGS. 1 and 2, the bridge structure 10 contains a support frame which has two side castings 30 and three cross tubes (not shown) that are fixed and welded between the side castings 30 to provide torsional rigidity to the bridge structure 10. Rollers 32 are provided along the media path 20 which are supported for rotation by ball bearings 34. The ball bearings 34 are mounted in the side castings 30 and are axially fixed by rings 36 provided in annular grooves 38 of the side castings 30. A spring 40 is provided on the roller shaft 42 between the roller 32 and the ball bearing 34 to take up axial play on the roller shaft 42 relative to the bearings 34. The rollers 32 are provided in pairs I-V along the media path 20. Those rollers 32 above the media path 20 are the driven idler rollers 44 and those below are the drive rollers 46. The lower drive rollers 46 each have a drive pulley 48 fitted onto the roller end shaft 50. Each drive pulley 48 has with it an over-running clutch 52 with the exception of the first drive roller 54 of the first pair of rollers I. The over-running clutch 52 allows only one way relative rotation between the drive roller end shaft 50 and the pulley 48. The over-running clutch 52 also allows the drive roller 46 to rotate faster than or over-run the driving speed of the pulley 48, such that a sheet of media may be pulled out of the bridge 10 by the processor or secondary storage device (not shown) at a speed that is faster than the transporting speed of the rollers I-V.

Referring to FIG. 3, each idler roller 44 is mounted with the end shafts 50 extending through tangential slots 54 within the side castings 30. The slots 54 have a longitudinal axis along the common axis C—C of each respective pair of rollers 32 so that the distance between the idler roller 44 and the drive roller 46 of each pair of rollers 32 may be adjusted. The top of the tangential slot 54 is provided with a spring device 58 for automatically adjusting the idler roller 44 against the drive roller 46. The nip pressure between the drive roller 46 and idler roller 44 is adjusted for various media thicknesses. In the preferred embodiment a spring loaded plunger 62 is located at the top of the slot 54 and is in contact with a hub portion of the roller to provide a force urging the rollers together. The spring device 58 is used in only the first two roller pairs 1, 11 (FIG. 1). In the last three pairs of rollers III-V, the common axis is approximately vertical when in the operational position, therefore the gravitational force on the upper idler roller 44 is sufficient to provide the necessary nip pressure for different media thicknesses to enable smooth transportation of the media 24.

Figure 4:
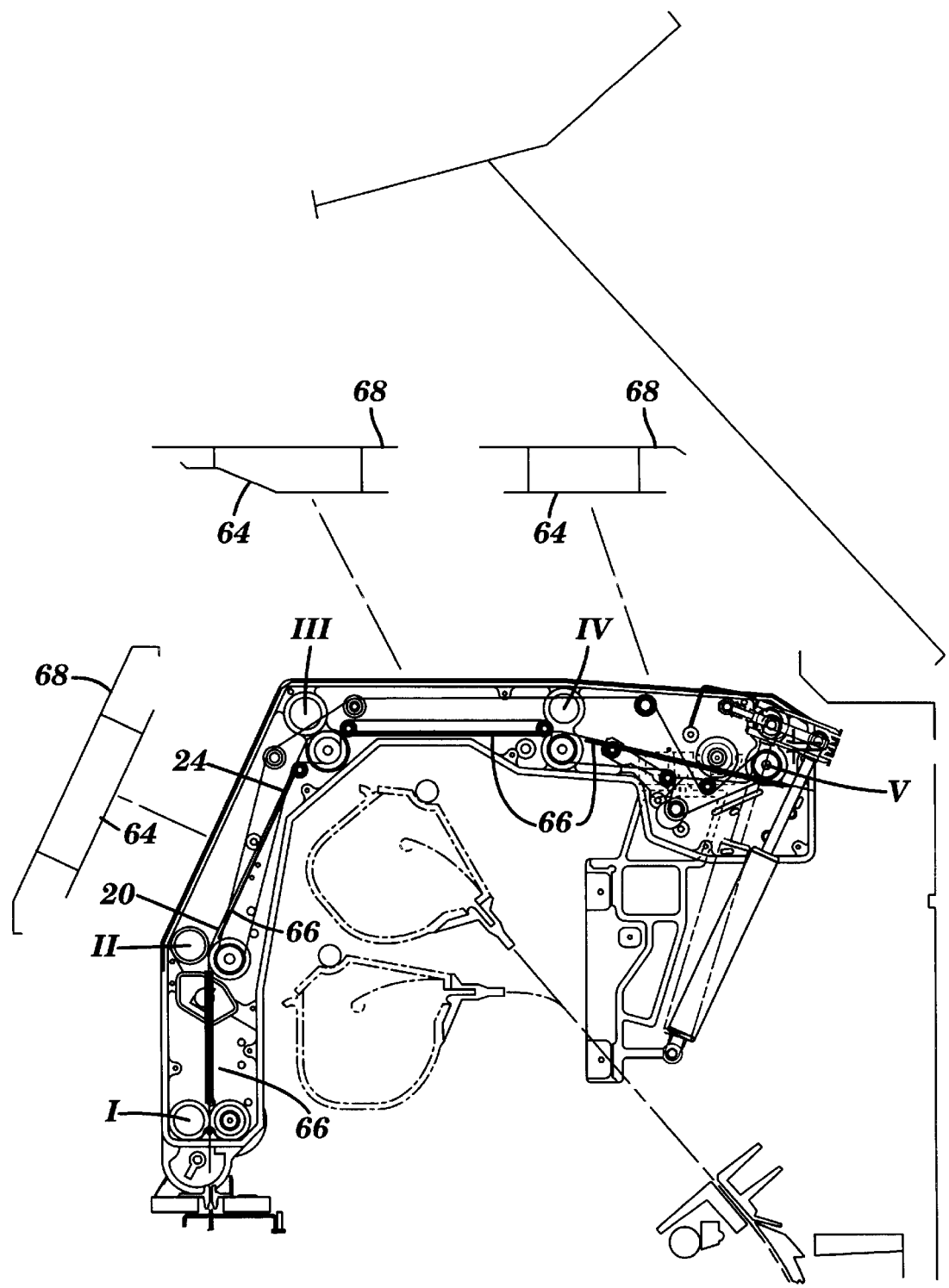
FIG. 4 is a side view of the bridge of FIG. 1 having and exposed media path with the cover panels removed.

Referring now to FIG. 4, upper platens 64 and lower platens 66 are substantially parallel to one another and are placed symmetrically around the plane of the media transport path 20, when assembled as in FIG. 1. The platens 64, 66 guide incoming media 24 in a substantially linear path and keep the media 24 flat during transportation. Covers 68 are fitted above and below the platens 64, 66 and fastened to the side castings 30 to prevent light from exposing the photosensitive media. The lower platens 66 are fixed to the support frame of the bridge 10 and the upper platens 64 are generally fixed to the inner sides of the top covers 68, such that when the covers 68 are open, the media path 20 is exposed. Spaced along the upper and lower platens 64, 66 are the five pairs of rollers I-V, each pair having the nip tangent to the media transport path 20.

Figure 5:
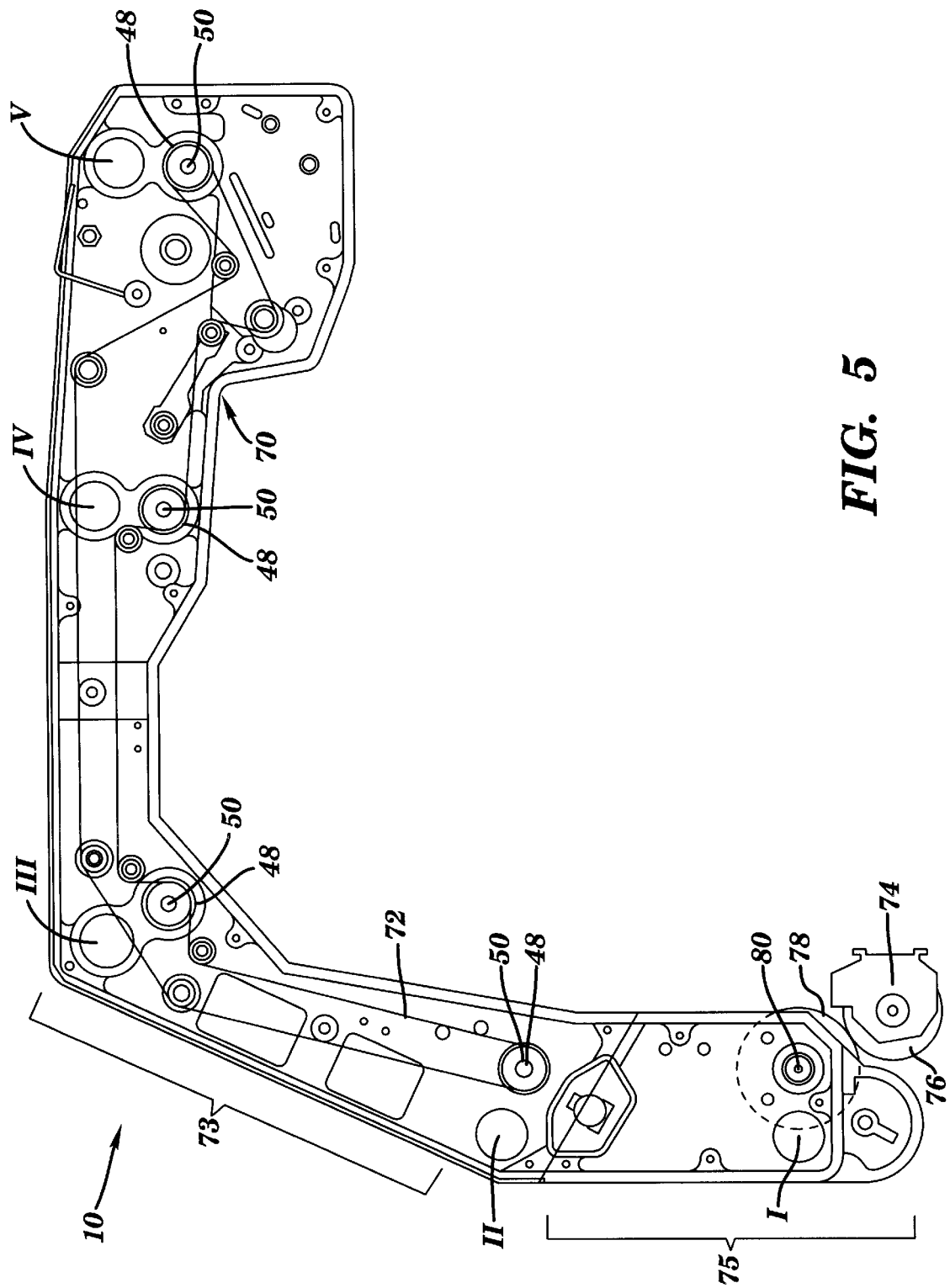
FIG. 5 is an enlarged side view of the bridge of FIG. 1 showing the internal drive system and the remote drive motor.

Referring to FIG. 5, the last four drive rollers 46, II-V, are connected together by a drive system, generally referred to as 70, which is shown as a synchronous belt drive 72 connecting the drive pulleys 48 on the last four roller end shafts 50. This portion of the transport bridge and the belt and pulley drive 72 is referred to as the second stage of the bridge 10, generally indicated as 73. It will be appreciated that the drive 70 may be any type of system that drives the drive rollers 46 in unison at substantially equal speeds. A drive motor (not shown) for the second stage 73 is attached in a conventional manner to the bridge 10 to drive the belt 72 and pulleys 48.

The first pair of rollers I is driven by a motor 74 which is independent and remote from the bridge structure 10, such that the first pair of rollers I serve as a bridge first stage, generally indicated as 75, which is independently driven. The first stage drive motor 74 is mounted inside of the imagesetter 14, and is coupled to the first stage roller pair I by a friction gear 76 mounted on the motor shaft in driving contact with a friction wheel 78 mounted on the end shaft 80 of the drive roller 46 of the first stage rollers I.

The end shafts 50 of all the drive rollers 46 are provided with a tapered portion (not shown) which can accommodate either the friction wheel 78 or the standard pulley 48 and clutch 52 assembly by a tapered fit. The rollers 32 therefore are generic with respect to their position within the bridge 10, keeping the rollers 32 homogeneous and less expensive.

Figure 6B:
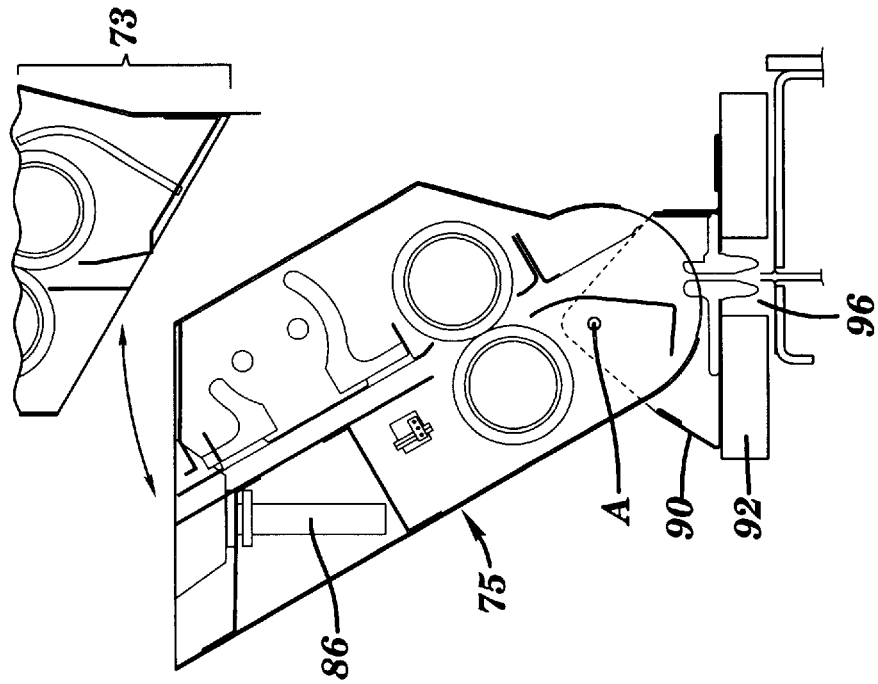
Figure 6A:
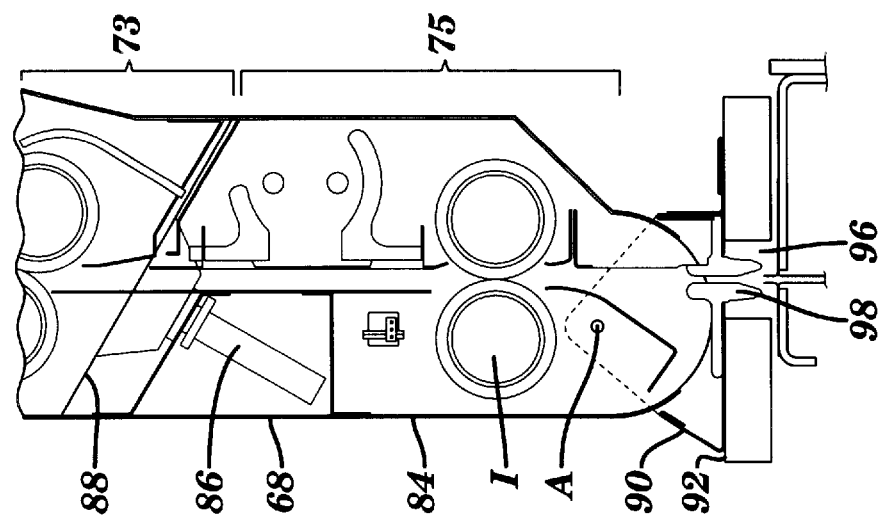

As an alternative to the heretofore described media "transport" mode, the bridge 10 is designed to allow a take-up cassette to be inserted into the take-up area where the media 24 normally enters the bridge 10 to provide a media "storage" mode. In FIGS. 6a–d it is shown that the first stage 75 of the bridge 10 is a removable unit which is removed by disengaging the two thumb screws 86 (one shown) at the interface 88 of the first and second stages, pulling the first stage 75 outward by the handles (not shown) provided on the front cover 68, and rotating the first stage 75 out of the bridge 10. To facilitate the removal of the first stage 75, the lower portion of the first stage 75 has a media guide 90 pivotable about point A. In FIG. 6b, the media guide 90 remains flush to a mounting platform 92 as the first stage 75 is rotated outward, due to the engagement of two aperture guide blocks 94 (FIG. 6c) mounted on the bottom of each side of the media guide 90 in a corresponding platform aperture 96 through which the media 24 passes. Then the first stage 75 is completely removed, disengaging the aperture guide blocks 94 from the platform aperture 96, as shown in FIG. 6c. The thumb screws 86 remain fastened to the first stage 75 upon disengagement from the second stage 73. The first stage 75 is then stored until the user wishes to return to an "on-line" operational state.

Referring to FIG. 6d, it is shown that to use the storage mode of the imaging device, the take-up cassette 97, which also has aperture guide blocks 94, is inserted onto the platform 92 such that the guide blocks 94 engage with the platform aperture 96. The take up cassette 97 is driven by the same motor 74 (FIG. 5) that drives the first stage 75 when installed. A friction wheel 99 is provided on the outside of the take-up cassette 97 to engage with the friction gear 76 (FIG. 5) when the take-up cassette 97 is inserted onto the platform 92. The friction wheel 99 is coupled to the media take-up core inside the cassette (not shown), thereby power assisting the winding of the media onto the take-up core. The covers of the imaging device are then closed to light-proof the interior of the imaging device 14.

The external covers 16 (FIG. 1) of the imaging device 14 are in the same position whether the device 14 is using the bridge 10 "on-line" or the take-up cassette which is aesthetically pleasing to the operator. Referring to FIG. 6B, to return to an on-line operation and reinstall the first stage 75, the first stage 75 is rested on the platform 92 and slid forward until the aperture guide blocks 94 engage the platform aperture 96, aligning a media guide mouthpiece 98 with the media path from the drum. The first stage 75 is then pivoted upward about point A relative to the media guide 90, until the first stage and the second stage interface at 88 as in FIG. 6A, and the thumb screws 86 are fastened.

As shown in FIG. 1, the bridge 10 is installed within the imaging device 14 and is pivotable about a rotational axis 110 and supported by two support arms 112 bolted to side plates (not shown) of the device. Two rotational axis bearings 114 are mounted on the support arms, one on each side of the bridge 10 respectively. The bearings provide accurate rotation and provide tolerance of axial misalignment.

Figure 7:
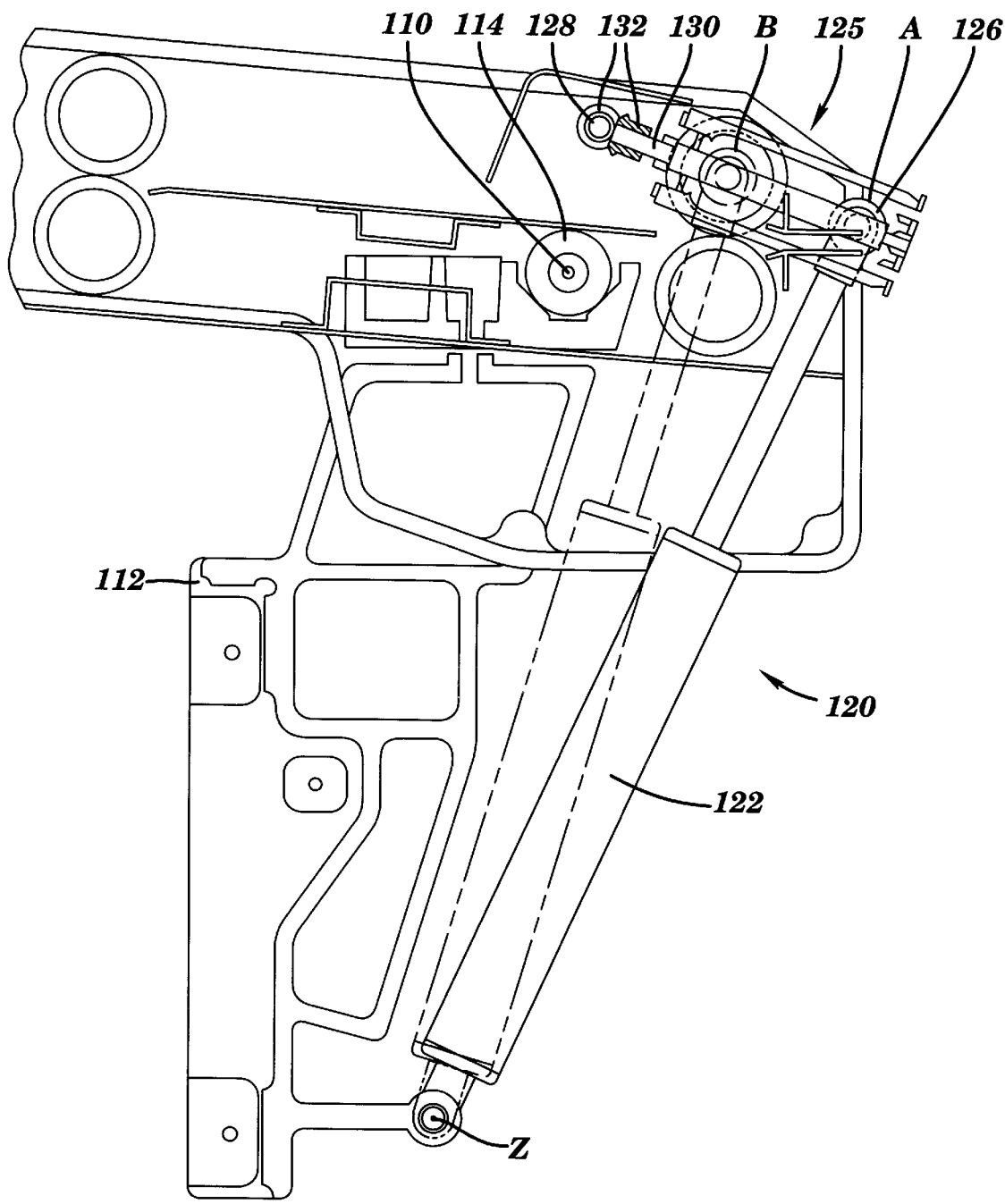
FIG. 7 is a side view of the adjustable counterbalancing system for the media transport bridge.

Support for the weight of the bridge 10 is provided by an assist mechanism, shown in FIGS. 1 and 7 and generally indicated as reference numeral 120. The assist mechanism has two gas shocks 122 secured at the support arms 112. The shocks 122 aid the user in lifting the bridge 10 out of the operational position and into a non-operational position to allow access to the media supply area 124. Spring devices and rotating cams affect the amount of counterbalance force supplied by the assist mechanism 120 upon rotation of the bridge 10 about the rotational axis 110, such that balance of the bridge 10 is maintained in most rotational positions.

The bridge 10 is pivoted upward using the two handles (not shown) provided in the front cover 68. The media guide 90 (FIG. 6a) of the first stage 75 is spring biased to pivot into a non-operational position while the bridge 10 is pivoted upward about the rotational axis 110. The media guide 90 is spring loaded to pivot counter-clockwise about the pivot point A during disengagement of the aperture guide blocks 94 (FIG. 6c) from the platform aperture 96. This feature of the bridge provides for alignment of the media path 24 passing through the bridge and the platform upon closing the bridge. The media guide 90 is already positioned to facilitate alignment of the aperture guide blocks 94 with the platform aperture 96 during closure of the bridge 10. When closing the bridge 10, the clockwise rotation of the bridge 10 about the rotational axis 110 brings the media guide 90 in contact with the platform surface 92. Upon continuing rotation, the loading force is counteracted by the interface of the media guide 90 and the platform 92, and the media guide 90 rotates counter clockwise relative to the pivot point A, aligning the complimentary aperture guide blocks 94 and platform aperture 96 for engagement, and resulting in alignment of the media path. The bridge can also be rotated about the rotational axis 110 when the first stage has been removed, for example, to facilitate installation and removal of the take-up cassette.

Upon removal of the first stage 75, it is necessary to counter balance the bridge 10 about its support point and rotational axis. Referring to FIG. 7, the force generated by the gas shocks 122 will cause uncontrolled rotation of the bridge upward about the rotational axis 110 in a clockwise direction if the decrease in the weight of the bridge is not compensated for. The bridge assist mechanism 120 is equipped with an adjustment mechanism 125 that changes the moment arm of the force produced by the gas shocks 122 with respect to the rotational axis 110 of the bridge. Decreasing the moment arm from position A to position B will decrease the clockwise torque about the rotational axis 110 provided by the gas shocks 122, to compensate for the decrease in the weight of the bridge 10 with the first stage removed and the corresponding decrease in counter-clockwise torque about the rotational axis 110. To accomplish the adjustment of the gas shocks 122, each shock 122 is attached at the top to a respective shuttle mechanism 126 on the bridge 10, one shuttle mechanism 126 on each side of the bridge 10. A drive shaft 128 traverses the width of the bridge 10 to drive a perpendicularly oriented lead screw 130 of each shuttle mechanism 126 through beveled gears 132 mounted on the drive shaft 128 and lead screw 130, respectively. Upon rotation of the drive shaft 128 each shuttle mechanism lead screw 130 is rotated causing linear movement of the shuttle between positions A and B along the lead screw 130, and simultaneously pivots the attached gas shock 122 about point Z, effectively changing the moment arm of the assist mechanism 120. Upon removal of the first stage 75 as in FIG. 6C, the shuttle mechanisms 126 automatically adjust the position of the gas shocks 122. The thumb screws 86 are monitored by a circuit in series such that upon a partial disengagement of either thumb screw 86, a signal is sent to command the drive shaft motor (not shown) to start, thus driving the shuttle mechanisms 126 from position A to position B and adjusting the bridge balance to an appropriate position just prior to full removal of the first stage 75. Upon replacement of the first stage 75 the thumb screws 86 must be completely engaged in order to change the circuit state and signal the shuttle mechanism drive motor, insuring that the bridge condition is stable before effecting the counter balance change. The rotation of the drive shaft is then reversed and the lead screws of the two shuttle mechanisms are rotated, translating the shuttles and attached gas shocks from position B to position A, thereby balancing the bridge with the first stage fully attached.

Figure 8:
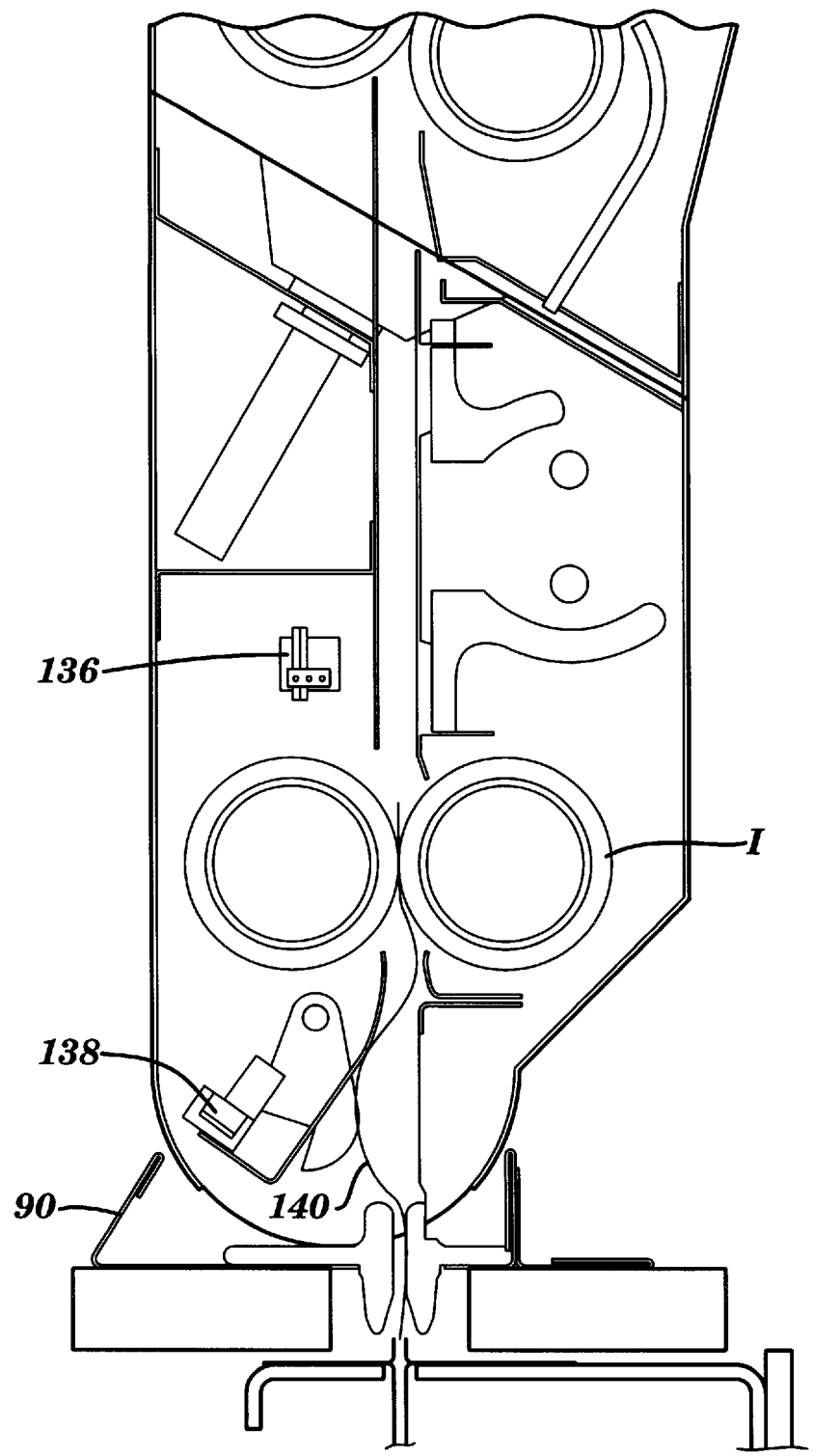
FIG. 8 is a side view of the first stage transport and a slack loop in the media.

With the media 24 loaded into position, a first image is recorded onto the media 24 on the drum 22 of the image recorder 14, as illustrated in FIG. 1. The media 24 is stationary during image recording and a leading edge 134 of the media 24 is held by an independent drum media transports system including, drum rollers 25. Referring to FIGS. 1 and 8, after the completion of the image, an input sensor 136 is polled to see if the first stage of the bridge 10 is clear. When the input sensor 136 signals that no media is present in the first stage 75, the drum rollers 25, the first stage rollers I and the second stage rollers II-V are driven. Initially the first and second stage rollers I-V are synchronously driven to run at a speed slightly slower than the drum rollers 25 advancing the media 24 from the drum 22. When the input sensor 136 detects the media 24 in the first stage 75 just beyond the first stage roller pair I, a loop sensor 138 located between the media guide 90 and the roller pair I is polled. Because the bridge rollers are driven at a speed slower than the drum rollers, a loop 140 forms in the first stage 75 and the loop sensor 138 sends a signal to synchronize the speed of the first and second stage rollers with the drum rollers. The loop sensor 138 is continuously polled so if the loop sensor signal is changed by the disappearance of the loop 140, then the bridge rollers I-V are slowed to allow the formation of the loop 140 again. The formation of the loop 140 isolates the portions of the web media 24 being handled by the independent transport systems of the drum and the bridge, thereby eliminating perturbations or disturbances in the motion along the media path.

The media 24 is advanced until the second page is positioned in the drum 22, the motors are halted, and the media is held by a punch generally referred to as reference number. The second page is then imaged, and the motors are subsequently restarted to advance the first image just past a media cutter 27. The motors are halted and the first image is cut from the web thereby forming a first page therefore. The external device to receive the media has an input sensor 98 which is continuously polled to see if it is ready to accept the media. When ready, the first and second stage drives are started to flush the first page out of the bridge. When the leading edge of the first page passes the input sensor 98 of the external device, the device's transport system 99 starts. If the device operates at a speed faster than the second stage drive system 70, the over-running clutches 52 allow the media 24 to be pulled out from the second stage of the bridge 10. The input sensor 136 indicates when the first stage 75 of the bridge 10 is clear and the imagesetter 14 begins to load the next page into position while the second stage continues the transport of the first page to the external device. The sequence is repeated. During the sequence, a counter is running to monitor transport malfunctions. An error is indicated if the input sensors of either the first stage or of the external device do not indicate media present within a certain time frame.

While this invention has been described in terms of a preferred embodiment, those skilled in the art will appreciate that various modifications, substitutions, omissions and changes may be made without departing from the spirit thereof. Accordingly, it is intended that the scope of the present invention be limited solely by the scope of the following claims, including equivalents thereof.

What we claim and desire to secure by Letters of Patent of the United States are the following:

1. A dual-mode media handling system having a transport mode and a storage mode, comprising:
   a. a first stage transport means for accepting and transporting media at a first media handling station during the transport mode of said dual-mode media handling system;
   b. a second stage transport means connected to said first stage transport means for delivering media from said first stage transport means to a second media handling station during the transport mode; and,
   c. a storage means for accepting and storing media at said first media handling station during the storage mode, wherein said first stage transport means is detachable from said second stage transport means and removable from said dual-mode media handling system during said storage mode and said storage means is mounted at the first media handling station instead of said first stage transport means upon removal of said first stage transport means from said dual-mode media handling system.

2. The dual-mode media handling system according to claim 1, further comprising a remote drive means engaged with said first stage transport means for driving said first stage transport means when said dual-mode media handling system is in said transport mode, said remote drive means being fixed within said dual-mode media handling system, such that upon removal of the first stage transport means, said first stage transport means disengages from said remote drive means.

3. The dual-mode media handling system according to claim 2, wherein said storage means comprises a power assisted take-up cassette, and said remote drive means engages and drives said power assisted take-up cassette when said handling system is in said storage mode.

4. A method for providing a transport mode and a storage mode in a dual-mode media handling system having a first stage transport removably connected to a second stage transport, and a storage container, said method comprising the steps of:
   a. accepting media in the first stage transport at first media handling station during transport mode of said media handling system;
   b. transporting media through the second stage transport from said first stage transport to a second media handling station during transport mode;
   c. disengaging the first stage transport from the second stage transport and removing the first stage transport from the dual-mode media handling system; and
   d. mounting the storage container at the first media handling station upon removal of the first stage transport and accepting and storing media in the storage container during the storage mode.

5. The method according to claim 4, further comprising the step of:
   a. driving the first stage transport means by means of a remote drive motor when in the transport mode; and
   b. disengaging the first stage transport from the remote drive upon removal of the first stage transport from the dual-mode media handling system.

6. An image recording system for recording a latent image onto a recording media and for processing the latent image recorded on said recording media, comprising:
   (a) an image recorder for recording the latent image onto the recording media, said image recorder including a front side, a rear side and a recording support surface substantially extending from said front side to said rear side;
   (b) a processing station adjacent to said rear side for processing the latent image recorded on said recording media; and,
   (c) a bridge including a media path for advancing the recording media from said recording support surface at the front side to said processing station at the rear side.

7. An imaging system according to claim 6 wherein a floor space footprint of said image recorder and said bridge is not greater than a floor space footprint of said image recorder alone.

8. An image recording system according to claim 6 wherein said image recorder includes a recording media supply area for providing at least one web of said recording media and wherein a floor space footprint of said media supply area, said image recorder and said bridge is not greater than a floor space footprint of said image recorder alone.

9. An image recording system according to claim 6 wherein said bridge includes a removable portion and wherein a take-up cassette including a take-up core is installed in place of said removable portion for receiving the recording media with said latent image recorded thereon and winding the recording media onto said take-up core.

10. An image recording system according to claim 9 wherein said image recorder further includes a drive apparatus for driving said take-up core, said drive apparatus winding the recording media onto said take-up core.

11. An image recording system for recording a latent image onto a recording media and for processing the latent image recorded on said recording media, comprising:
   (a) an image recorder for recording the latent image onto the recording media, said image recorder including a front side, a rear side, a recording support surface substantially extending from said front side to said to rear side, a web media supply area for providing at least one web of said recording media, a media transport system for advancing a leading edge of said recording media from said media supply area across said recording support surface starting at said rear side and advancing toward said front side, a bridge having a media path for transporting the leading edge of said recording media from said recording support surface at the front side and out the rear side of the image recorder, a media cutter positioned between said recording surface and said bridge for cutting a page from said recording media, said page including at least one latent image; and;
   (b) a processor station adjacent to the rear side of the image recorder, said processor station including a media transport apparatus for receiving said page from said bridge and for processing said at least one latent image recorded on said page.

12. An image recording system according to claim 6, 7, 8, 9, 10, or 11 wherein said image recorder is an internal drum recorder and wherein said recording support surface is formed by the inner surface of a cylinder having a diameter which substantially extends from said front side to said rear side.

13. An image recording system according to claim 11 wherein said bridge includes a removable portion and wherein a take-up cassette including a take-up core is installed in place of said removable portion for receiving the leading edge of said recording media from said media transport system and winding said recording media onto said take-up core, said recording media having at least one latent image recorded thereon.

14. An image recording system according to claim 13 wherein said image recorder further includes a drive apparatus for driving said take-up core thereby winding the recording media onto said take-up core.

15. An image recorder for recording a latent image onto a recording media, said image recorder having a front side and a rear side, comprising:
   (a) a supply web of said recording media;
   (b) an image recording surface substantially extending from the front side to the rear side of said image recorder;
   (c) a media transport system for advancing a leading edge of said recording media across said image recording surface starting from the rear side of said image recorder and advancing toward the front side of said image recorder;
   (d) a cutter for cutting said recording media to form a page, said page having a leading edge and at least one latent image recorded thereon; and,
   (e) a bridge having a media path for advancing the leading edge of said page from said image recording surface at the front side of said image recorder to an exit at the rear side of said image recorder.

16. An image recorder according to claim 15 further including a system for pivotally mounting said bridge about a pivot axis adjacent the rear side of said image recorder, wherein said bridge is pivotable about said pivot axis from an operating position to a non-operating position.

17. An image recorder according to claim 16 further comprising an assist mechanism, connected between said bridge and an image recorder frame member, for providing a counterbalancing force to support said bridge upon rotation about said pivot axis, said counterbalancing force holding said bridge stationary in a plurality of non-operating rotational positions.

18. An image recorder according to claim 17 wherein said bridge includes a removable portion and wherein said assist mechanism automatically adjusts said counterbalancing force when said removable portion is removed from said bridge.

19. An image recorder according to claim 15 wherein said bridge includes a removable portion, and wherein a take-up cassette including a take-up core is installed in place of said removable portion for receiving the leading edge of said recording media from said media transport system and winding said recording media onto said take-up core, said recording media having at least one latent image recorded thereon.

20. An image recorder according to claim 19 wherein said image recorder further includes a drive apparatus for driving said take-up core to wind said media onto said take-up core.

21. An image recorder according to claim 15 wherein said image recording surface is an internal drum recording surface and wherein said bridge comprises:

(a) a first stage including a media path formed between at least one drive roller and at least one driven idler roller for receiving said page from said media transport system;

(b) a second stage including a media path formed between at least one drive roller and at least one driven idler roller for receiving said page from said first stage and advancing it out the rear side of said image recorder;

(c) first means for driving said at least one first stage drive roller independently from said at least one second stage drive roller; and, (d) second means for driving said at least one second stage drive roller independently from said at least one first stage drive roller.

22. A method for recording an image onto a recording media using an image recorder having a front side, a rear side and a recording surface substantially extending from said front side to said rear side, comprising the steps of:

(a) advancing the recording media from a media supply area across said recording surface starting at the rear side of said image recorder and advancing toward the front side of said image recorder;

(b) holding the recording media stationary with respect to said recording surface while recording a latent image thereon; and, (c) advancing said recording media from the recording surface at the front side of said image recorder and out the rear side of said image recorder.

23. A method for recording an image according to claim 22, further comprising the steps of:

(a) positioning a processing station including a media transport system at the rear side of said image recorder;

(b) passing said recording media having a latent image recorded thereon from the rear side of said image recorder to said media transport system; and, (c) processing said latent image.

24. A method for operating an imaging system in an automatic processing mode, comprising the steps of:

(a) recording a latent image onto a recording media with an image recorder, said image recorder including a front side, a rear side, a recording support surface substantially extending from the front side of said image recorder to the rear side of said image recorder, a web media supply area for providing at least one web of said recording media, a media transport system for advancing a leading edge of said recording media from said media supply area across said recording surface starting at the rear side of said image recorder and advancing toward the front side of said image recorder, a bridge having a media path for transporting the leading edge of said recording media from said recording surface at the front side of said image recorder and out the rear side of the image recorder, a media cutter positioned between said recording surface and said bridge for cutting a page from said web, said page having at least one latent image recorded thereon; and;

(b) processing the latent image recorded on the recording media with a processor station positioned adjacent to the rear side of the image recorder, said processor station including a media transport apparatus for receiving said page from said bridge and for processing said at least one latent image recorded on said page.

25. A method for operating an imaging system in an automatic processing mode or in a storage mode. comprising the steps of:

(a) recording a latent image onto a recording media with an image recorder, said image recorder including a front side, a rear side, a recording support surface substantially extending from the front side of said image recorder to the rear side of said image recorder, a web media supply area for providing at least one web of said recording media, a media transport system for advancing a leading edge of said recording media from said media supply area across said recording surface starting at the rear side of said image recorder and advancing toward the front side of said image recorder;

(b) transporting said recording media on a bridge having a media path for transporting the leading edge of said recording media from said recording surface at the front side of said image recorder and out the rear side of said image recorder, said bridge including a removable portion;

(c) cutting a page from said web with a media cutter positioned between said recording surface and said bridge, said page having at least one latent image recorded thereon;

(d) processing the latent image recorded on the recording media with a processor station positioned adjacent to the rear side of the image recorder, said processor station including a media transport apparatus for receiving said page from said bridge and for processing said at least one latent image recorded on said page; and (e) exchanging said removable portion with a take-up cassette including a take-up core for receiving the leading edge of said recording media and for winding said recording media onto said take-up core, said take-up cassette being interchangeable with said removable portion for changing from said automatic processing mode to said storage mode.

* * * * *